United States Patent [19]
Li et al.

[11] Patent Number: 4,916,000
[45] Date of Patent: Apr. 10, 1990

[54] BALLISTIC-RESISTANT COMPOSITE ARTICLE

[75] Inventors: Hsin L. Li; Dusan C. Prevorsek; Gary A. Harpell; Young D. Kwon, all of Morris, N.J.

[73] Assignee: Allied-Signal Inc., Morris Township, Morris County, N.J.

[21] Appl. No.: 62,998

[22] Filed: Jul. 13, 1987

[51] Int. Cl.⁴ .................................................. B32B 5/12
[52] U.S. Cl. ..................................... 428/105; 428/114; 428/224; 428/284; 428/285; 428/347; 428/348; 428/902; 428/911
[58] Field of Search ............... 428/105, 114, 224, 284, 428/295, 397, 398, 902, 911, 285

[56] References Cited

U.S. PATENT DOCUMENTS

| | | | |
|---|---|---|---|
| 4,403,012 | 6/1983 | Harpell et al. | 428/290 |
| 4,428,998 | 1/1984 | Hawkinson | 428/240 |
| 4,457,985 | 7/1984 | Harpell et al. | 428/224 |
| 4,510,200 | 4/1985 | Samowich | 428/252 |
| 4,522,871 | 6/1985 | Armellino, Jr. et al. | 428/252 |
| 4,613,535 | 9/1986 | Harpell et al. | 428/113 |
| 4,623,574 | 11/1986 | Harpell et al. | 428/113 |
| 4,650,710 | 3/1987 | Harpell et al. | 428/113 |
| 4,737,401 | 4/1988 | Harpell et al. | 428/252 |
| 4,737,402 | 4/1988 | Harpell et al. | 428/252 |
| 4,748,064 | 5/1988 | Harpell et al. | 428/113 |

OTHER PUBLICATIONS

R. C. Laible et al., The Application of High Modulus Fibers to Ballistic Protection, *J. Macromol. Sci-Chem*, A7(1), pp. 295-322, (1973).

A. L. Alesi et al., New Materials and Construction for Improved Helmets, NTIS publication, AD-A018 958, pp. 1-11, (1975).

A. L. Lastnik et al., The Effect of Resin Concentration and Laminating Pressures on Kevlar Fabric Bonded with a Modified Phenolic Resin, Technical Report NATICK/TR-84/030, pp. 1-15 (1984).

*Primary Examiner*—James J. Bell
*Attorney, Agent, or Firm*—Richard C. Stewart; Gerhard H. Fuchs

[57] ABSTRACT

The present invention provides an improved composite which comprises one or more layers, at least one of said layers comprising network of high strength filaments having a tensile modulus of at least about 160 grams/denier, a tenacity of at least about 7 g/denier and an energy-to-break of at least about 8 joules/gram in a matrix material, the ratio of the thickness of said layer to the equivalent diameter of said filaments is equal to or less than about 12.8, and complex composite articles formed from said composite.

58 Claims, 4 Drawing Sheets

BALLISTIC-RESISTANT COMPOSITE ARTICLE

BACKGROUND OF THE INVENTION

1. Field of the Invention

This invention relates to ballistic resistant composite articles More particularly, this invention relates to such articles having improved ballistic protection.

2. Prior Art

Ballistic articles such as bulletproof vests, helmets, structural members of helicopters and other military equipment, vehicle panels, briefcases, raincoats and umbrellas containing high strength fibers are known. Fibers conventionally used include aramid fibers such as poly(phenylenediamine terephthalamide), graphite fibers, nylon fibers, ceramic fibers, glass fibers and the like. For many applications, such as vests or parts of vests, the fibers are used in a woven or knitted fabric. For many of the other applications, the fibers are encapsulated or embedded in a composite material In "The Application of High Modulus Fibers to Ballistic Protection" R. C. Laible et al., J. Macromol. Sci.-Chem. A7(1), pp. 295–322 1973, it is indicated on p. 298 that a fourth requirement is that the textile material have a high degree of heat resistance; for example, a polyamide material with a melting point of 255° C. appears to possess better impact properties ballistically than does a polyolefin fiber with equivalent tensile properties but a lower melting point. In an NTIS publication, AD-A018 958 "New Materials in Construction for Improved Helmets", A. L. Alesi et al., a multilayer highly oriented polypropylene film material (without matrix), referred to as "XP", was evaluated against an aramid fiber (with a phenolic/polyvinyl butyral resin matrix). The aramid system was judged to have the most promising combination of superior performance and a minimum of problems for combat helmet development.

U.S. Pat. Nos. 4,403,012 and 4,457,985 disclose ballistic-resistant composite articles comprised of networks of high molecular weight polyethylene or polypropylene fibers, and matrices composed of olefin polymers and copolymers, unsaturated polyester resins, epoxy resins, and other resins curable below the melting point of the fiber.

A. L. Lastnik, et al.; "The Effect of Resin Concentration and Laminating Pressures on KEVLAR® Fabric Bonded with Modified Phenolic Resin", Technical Report NATICK/TR-84/030, June 8, 1984; disclose that an interstitial resin, which encapsulates and bonds the fibers of a fabric, reduces the ballistic resistance of the resultant composite article.

SUMMARY OF THE INVENTION

One aspect of the present invention relates to a ballistic-resistant rigid or flexible composites comprised of one or more layers, at least one of said layers comprising a network of high strength filaments having a tenacity of at least about 7 grams/denier, a tensile modulus of at least about 160 grams/denier and an energy-to-break of at least about 8 joules/gram in a matrix material, the ratio of the thickness of said layer to an "equivalent diameter" of said filaments is equal to or less than about 12.8. As used herein the "equivalent diameter" of a filament is the diameter of a circle having a cross-sectional area equal to the average cross-sectional area of the filaments in the layer. As used herein, a filament is an elongated body, the length dimension of which is much greater than the transverse dimensions of width and thickness. Accordingly, the term filament includes simple filament, ribbon, strips and the like having regular or irregular cross-section.

It has also been discovered that the equivalent diameter of the filament, and the thickness of the layer containing network of the filament has an effect on the degree of ballistic protection provided, particularly against small caliber ballistic projectiles, i.e. 50 caliber or less, preferably, projectiles of 30 caliber or less and more particularly, projectiles of 15 caliber or less. In general, the smaller the equivalent diameter of the filaments and the thinner the layer, the greater the degree of protection provided, when compared to the protection provided by a composite of comparable weight but having thicker layers and filaments having larger equivalent diameters. Ideally, filaments having the minimum equivalent diameters formed into layers having the minimum thickness will be used.

Compared to conventional ballistic-resistant armor structures, the composite article of the present invention can advantageously provide a selected level of ballistic protection while employing a reduced weight of protective material, alternatively, the article of the present invention can provide increased ballistic protection when the article has a weight equal to the weight of a conventionally constructed piece of composite armor.

Another aspect of this invention relates to a novel process for forming a network comprising a sheet-like array of filaments in which said filaments are aligned substantially parallel to one another along a common filament direction such as a prepreg, a pultruded sheet and the like, said filaments having a tenacity of at least about 7 grams/denier, a tensile modulus of at least about 160 grams/denier and an energy-to-break of at least about 8 joules/gram in a matrix material wherein the ratio of the thickness of said sheet-like array to the equivalent diameter of said filaments contained therein is equal to or less than about 12.8, which comprises the steps of:

(a) aligning bundles of high strength filaments comprising a plurality of high strength filaments said filaments having a tenacity of at least about 7 grams/denier, a tensile modulus of at least about 160 grams/denier and an energy-to-break of at least about 8 joule/gram in a sheet like array in which said filaments are arranged substantially parallel to one another along a common filament direction;

(b) passing said aligned bundles of filaments through a plurality of spreading means under tension to align individual filaments contained in said bundles of filaments in a substantially coplanar fashion such that tension upstream of said spreading means ($T_1$) is equal to or less than about 0.3 grams per denier ("gpd"), and tension downstream of said spreading means ($T_2$) is equal to or less than about 0.6 gpd, and $T_1$ and $T_2$ individually are not greater than the tensile strength of the weakest filament and said spreading means comprising at least one of elongated body having a substantially circular cross-section positioned substantially perpendicular to the longitudinal axis of said aligned bundles of filaments and positioned relative to said aligned bundles filaments such that the arc of contact between said means and said aligned bundles of filament is equal to or greater than about 30°, thereby spreading said bundles of filaments to increase the coplanarity of filaments contained in said bundles to any extent;

(c) coating said spread filaments with a matrix material; and (d) consolidating said coated filaments to form a layer comprising a network of said filaments dispersed in said matrix material such that the ratio of the thickness of said layer to the equivalent diameter of said filaments is equal to or less than about 12.8.

BRIEF DESCRIPTION OF THE DRAWINGS

The invention will be more fully understood and further advantages will become apparent when reference is made to the following detailed description of the invention and the accompanying drawings in which.

DETAILED DESCRIPTION OF THE INVENTION

Figure 1:
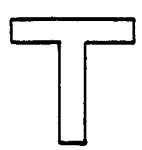
FIGS. 1 to 13 are various cross-sections of various multilobal fibers.
Figure 2:
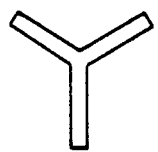
Figure 3:
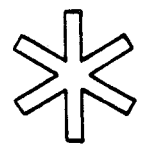
Figure 4:
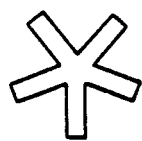
Figure 5:
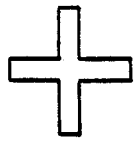
Figure 6:
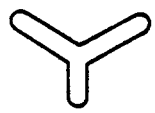
Figure 7:
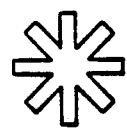
Figure 8:
Figure 9:
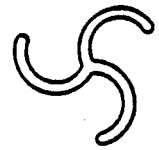
Figure 10:
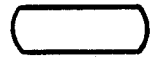
Figure 11:
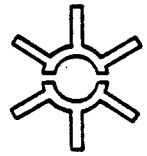
Figure 12:
Figure 13:

Composites of this invention include one or more layers of a filament network, at least one of which is said that the ratio of the thickness of the layer to the equivalent diameter of the filaments is equal to or less than about 12.8. Surprisingly, we have discovered that the value of this ratio has a significant effect on the ballistic protection provided by the composite. In general, the closer the ratio approaches to 1, the greater the ballistic protection provided, and conversely, the further the ratio diverges from 1, the less ballistic protection provided. In the preferred embodiments of the invention, the filament is a mono-filament.

The cross-sections of filaments for use in this invention may vary widely. They may be of circular or of oblong or of irregular or regular multi-lobal cross-section having one or more regular or irregular lobes projecting from the linear or longitudinal axis of the filament. In the particularly preferred embodiments of the invention, the filaments are of substantially circular or oblong cross-section and in the most preferred embodiments are circular or substantially circular cross-section.

In the preferred embodiments of the invention, the ratio of the thickness of the layer to the equivalent diameter of the filament is equal to or less than about 10, and in the particularly preferred embodiments of the invention, the ratio is equal to or less than about 8. Amongst these particularly preferred embodiments of the invention, most preferred are those embodiments in which the ratio of the thickness of the layer to the equivalent diameter of the filament is equal to or less than about 6, with a ratio of between about 1 and about 5 being the ratio of choice.

The equivalent diameter of the filaments and the thickness of the layer may vary widely. In general, the smaller the equivalent diameter and the thinner the layer, the greater the ballistic protection provided; and conversely, the greater the equivalent diameter of the filament and the greater the thickness of the layers, the lower the ballistic protection provided.

In the preferred embodiments of the invention, the equivalent diameter of the filaments is equal to or less than about 0.01 cm, and the thickness of the layer is equal to or less than about 0.04 cm. In the particularly preferred embodiments of the invention, the equivalent diameter of the filaments is from about 0.001 cm to about 0.008 cm, and the thickness of the layer is equal to or less than about 0.03 cm. Amongst these particularly preferred embodiments, most preferred are those embodiments in which the thickness of the layer is from about 0.0007 cm to about 0.02 cm, with a thickness of from about 0.002 cm to about 0.02 cm being the thickness of choice; and the equivalent diameter of the filaments is from about 0.002 cm to about 0.005 cm.

In the composite articles of our invention, the filaments may be arranged in networks having various configurations. For example, a plurality of filaments can be grouped together to form a twisted or untwisted yarn bundles in various alignment. In preferred embodiments of the invention, the filaments in each layer are aligned substantially parallel and unidirectionally in which the matrix material substantially coats the individual filaments of the filaments. The filaments or yarn may be formed as a felt, knitted or woven (plain, basket, satin and crow feet weaves, etc ) into a network, fabricated into non-woven fabric, arranged in parallel array, layered, or formed into a fabric by any of a variety of conventional techniques. Among these techniques, for ballistic resistance applications we prefer to use those variations commonly employed in the preparation of aramid fabrics for ballistic-resistant articles. For example, the techniques described in U.S. Pat. No. 4,181,768 and in M. R. Silyquist et al. *J. Macromol Sci. Chem.*, A7(1), pp. 203 et. seq. (1973) are particularly suitable.

The type of filaments used in the fabrication of the article of this invention may vary widely and can be metallic filaments, semi-metallic filaments, inorganic filaments and/or organic filaments. Preferred filaments for use in the practice of this invention are those having a tenacity equal to or greater than about 10 g/d, a tensile modulus equal to or greater than about 150 g/d and an energy-in-break equal to or greater than about 8 joules/grams. Particularly preferred filaments are those having a tenacity equal to or greater than about 20 g/d, a tensile modulus equal to or greater than about 500 g/d and energy-to-break equal to or greater than about 30 joules/grams. Amongst these particularly preferred embodiments, most preferred are those embodiments in which the tenacity of the filaments are equal to or greater than about 25 g/d, the tensile modulus is equal to or greater than about 1000 g/d, and the energy-to-break is equal to or greater than about 35 joules/gram. In the practice of this invention, filaments of choice have a tenacity equal to or greater than about 30 g/d, the tensile modulus is equal to or greater than about 1300 g/d and the energy-to-break is equal to or greater than about 40 joules/gram.

Filaments for use in the practice of this invention may be metallic, semi-metallic, inorganic and/or organic. Illustrative of useful inorganic filaments are those formal from S-glass, silicon carbide, asbestos, basalt, E-glass, alumina, alumina-silicate, quartz, zirconia-silica, ceramic filaments, boron filaments, carbon filaments, and the like. Exemplary of useful metallic or semi-metallic filaments are those composed of boron, aluminum, steel and titanium. Illustrative of useful organic filaments are those composed of aramids (aromatic polyamides), poly(m-xylene adipamide), poly(p-xylylene sebacamide), poly(2,2,2-trimethylhexamethylene terephthalamide), poly(piperazine sebacamide), poly(-metaphenylene isophthalamide) (Nomex) and poly(p-phenylene terephthalamide) (Kevlar) and aliphatic and cycloaliphatic polyamides, such as the copolyamide of 30% hexamethylene diammonium isophthalate and 70% hexamethylene diammonium adipate, the copolyamide of up to 30% bis-(-amidoclyclohexyl) methylene, terephthalic acid and caprolactam, polyhexamethylene adipamide (nylon 66), poly(butyrolactam) (nylon 4), poly(9-aminonoanoic acid) nylon 9), poly(enantholactam) (nylon 7), poly(capryllactam) (nylon 8), polycaprolactam (nylon 6), poly(p-phenylene terephthalamide), polyhexamethylene sebacamide (nylon 6,10), polyaminoundecanamide (nylon 11), polydodecanolactam (nylon 12), polyhexamethylene isophthalamide, polyhexamethylene terephthalamide, polycaproamide, poly(nonamethylene azelamide) Nylon 9,9), poly(decamethylene azelamide) (nylon 10,9), poly(decamethylene sebacamide) (nylon 10,10), poly[bis-(4-aminocyclohexyl)methane 1,10-decanedicarboxamide] (Qiana)(trans), or combination thereof; and aliphatic, cycloaliphatic and aromatic polyesters such as poly(1,4-cyclohexylidene dimethyl eneterephathalate) cis and trans, poly(ethylene-1,5-naphthalate), poly(ethylene-2,6-naphthalate), poly(1,4-cyclohexane dimethylene terephthalate) (trans), poly(decamethylene terephthalate), poly(ethylene terphthalate), poly(ethylene isophthalate), poly(ethylene oxybenzoate), poly(para-hydroxy benzoate), poly($\alpha,\alpha$ dimethylpropiolactone), poly(decamethylene adipate), poly(ethylene succinate) and the like.

Also illustrative of useful organic filaments are those composed of extended chain polymers formed by polymerization of $\alpha,\beta$-unsaturated monomers of the formula:

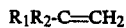

$$R_1R_2-C=CH_2$$

wherein:

$R_1$ and $R_2$ are the same or different and are hydrogen, hydroxy, halogen, alkylcarbonyl, carboxy, alkoxycarbonyl, heterocycle or alkyl or aryl either unsubstituted or substituted with one or more substituents selected from the group consisting of alkoxy, cyano, hydroxy, alkyl and aryl. Illustrative of such polymers of $\alpha,\beta$-unsaturated monomers are polymers including polystyrene, polyethylene, polypropylene, poly(1-octadecene), polyisobutylene, poly(1-pentene), poly(2-methylstyrene), poly(4-methylstyrene), poly(1-hexene), poly(1-pentene), poly(4-methoxystrene), poly(5-methyl-1-hexene), poly(4-methylpentene), poly(1-butene), poly(3-methyl-1-butene), poly(3-phenyl-1-propene), polyvinyl chloride, polybutylene, polyacrylonitrile, poly(methyl pentene-1), poly(vinyl alcohol), poly(vinylacetate), poly(vinyl butyral), poly(vinyl chloride), poly(vinylidene chloride), vinyl chloride-vinyl acetate chloride copolymer, poly(vinylidene fluoride), poly(methyl acrylate), poly(methyl methacrylate), poly(methacrylonitrile), poly(acrylamide), poly(vinyl fluoride), poly(vinyl formal), poly(3-methyl-1-butene), poly(1-pentene), poly(4-methyl-1-butene), poly(1-pentene), poly(4-methyl-1-pentene), poly(1-hexane), poly(5-methyl-1-hexene), poly(1-octadecene), poly(vinyl cyclopentane), poly(vinylcyclohexane), poly(a-vinylnaphthalene), poly(vinyl methyl ether), poly(vinylethylether), poly(vinyl propylether), poly(vinyl carbazole), poly(vinyl pyrrolidone), poly(2-chlorostyrene), poly(4-chlorostyrene), poly(vinyl formate), poly(vinyl butyl ether), poly(vinyl octyl ether), poly(vinyl methyl ketone), poly(methylisopropenyl ketone), poly(4-phenylstyrene) and the like.

In the most preferred embodiments of the invention, composite articles include a filament network, which may include a high molecular weight polyethylene filament, a high molecular weight polypropylene filament, an aramid filament, a high molecular weight polyvinyl alcohol filament, a high molecular weight polyacrylonitrile filament or mixtures thereof. U.S. Pat. No. 4,457,985 generally discusses such high molecular weight polyethylene and polypropylene filaments, and the disclosure of this patent is hereby incorporated by reference to the extent that it is not inconsistent herewith. In the case of polyethylene, suitable filaments are those of molecular weight of at least 150,000, preferably at least one million and more preferably between two million and five million. Such extended chain polyethylene (ECPE) filaments may be grown in solution as described in U.S. Pat. No. 4,137,394 to Meihuzen et al., or U.S. Pat. No. 4,356,138 of Kavesh et al., issued Oct. 26, 1982, or a filament spun from a solution to form a gel structure, as described in German Off. No. 3,004,699 and GB No. 2051667, and especially as described in application Ser. No. 572,607 of Kavesh et al. filed Jan. 20, 1984 (see EPA No. 64,167, published Nov. 10, 1982). As used herein, the term polyethylene shall mean a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated by reference. Depending upon the formation technique, the draw ratio and temperatures, and other conditions, a variety of properties can be imparted to these filaments. The tenacity of the filaments should be at least 15 grams/denier, preferably at least 20 grams/denier, more preferably at least 25 grams/denier and most preferably at least 30 grams/denier. Similarly, the tensile modulus of the filaments, as measured by an Instron tensile testing machine, is at least 300 grams/denier, preferably at least 500 grams/denier and more preferably at least 1,000 grams/denier and most preferably at least 1,200 grams/denier. These highest values for tensile modulus and tenacity are generally obtainable only by employing solution grown or gel filament processes. Many of the filaments have melting points higher than the melting point of the polymer from which they were formed. Thus, for example, high molecular weight polyethylenes of 150,000, one million and two million generally have melting points in the bulk of 138° C. The highly oriented polyethylene filaments made of these materials have melting points of from about 7° to about 13° C. higher. Thus, a slight increase in melting point reflects the crystalline perfection and higher crystalline orientation of the filaments as compared to the bulk polymer. Nevertheless, the melting points of these filaments remain substantially below nylon; and the efficacy of these filaments for ballistic resistant articles is contrary to the various teachings cited above which indicate temperature resistance as a critical factor in selecting ballistic materials. Notwithstanding the contrary teachings in the prior art, improved ballistic resistant articles are formed when polyethylene filaments having a weight average molecular weight of at least about 150,000, a modulus of at least about 500 and a tenacity of at least about 15 g/denier are employed. Cf. John V. E. Hansen and Roy C. Laible in "Flexible Body Armor Materials," Filament Frontiers ACS Conference, June 10-12, 1974 (ballistically resistent high strength filaments must exhibit high melting point and high resistance to cutting or shearing); Roy C. Laible, *Ballistic Materials and Penetration Mechanics*, 1980 (noting that nylon and polyester may be limited in their ballistic effectiveness due to the lower melting point); and "The Application of High Modulus Filaments to Ballistic Protection", R. C. Laible, et al., *J. Macromel. Sci. Chem.*, A7(1), pp. 295–322, 1973 (the importance of a high degree of heat resistance is again discussed).

Similarly, highly oriented polypropylene filaments of molecular weight at least 200,000, preferably at least one million and more preferably at least two million may be used. Such high molecular weight polypropylene may be formed into reasonably well oriented filaments by the techniques prescribed in the various references referred to above, and especially by the technique of U.S. Ser. No. 572,607, filed Jan. 20, 1984, of Kavesh et al. and commonly assigned. Since polypropylene is a much less crystalline material than polyethylene and contains pendant methyl groups, tenacity values achievable with polypropylene are generally substantially lower than the corresponding values for polyethylene. Accordingly, a suitable tenacity is at least 8 grams/denier, with a preferred tenacity being at least 11 grams/denier. The tensile modulus for polypropylene is at least 160 grams/denier, preferably at least 200 grams/denier. The melting point of the polypropylene is generally raised several degrees by the orientation process, such that the polypropylene filament preferably has a main melting point of at least 168° C., more preferably at least 170° C. The particularly preferred ranges for the above-described parameters can advantageously provide improved performance in the final article. Employing filaments having a weight average molecular weight of at least about 200,000 coupled with the preferred ranges for the above-described parameters (modulus and tenacity) can provide advantageously improved performance in the final article especially in ballistic resistant articles, notwithstanding the contrary teachings in the prior art). C.f. Laible, *Ballistic Materials and Penetration Mechanics*, supra, at p. 81 (no successful treatment has been developed to bring the ballistic resistance of polypropylene up to levels predicated from the yarn stress-strain properties); and The relative effectiveness of NTIS publication AD-A018 958, "New Materials in Construction for Improved Helmets", A. L. Alesi et al. [wherein a multi-layer highly oriented polypropylene film material (without matrix), referred to as "XP", was evaluated against an aramid filament (with a phenolic/polyvinyl butyral resin matrix); the aramid system was judged to have the most promising combination of superior performance and a minimum of problems for combat helmet development].

High molecular weight polyvinyl alcohol filaments having high tensile modulus are described in U.S. Pat. No. 4,440,711 to Y. Kwon, et al., which is hereby incorporated by reference to the extent it is not inconsistent herewith. In the case of polyvinyl alcohol (PV-OH), PV-OH filament of molecular weight of at least about 200,000. Particularly useful PV-OH filament should have a modulus of at least about 300 g/denier, a tenacity of at least about 7 g/denier (preferably at least about 10 g/denier, more preferably at about 14 g/denier, and most preferably at least about 17 g/denier), and an energy to break of at least about 8 joules/g. PV-OH filaments having a weight average molecular weight of at least about 200,000, a tenacity of at least about 10 g/denier, a modulus of at least about 300 g/denier, and an energy to break of about 8 joules/g are more useful in producing a ballistic resistant article. PV-OH filament having such properties can be produced, for example, by the process disclosed in U.S. Pat. No. 4,599,267.

In the case of polyacrylonitrile (PAN), PAN filament of molecular weight of at least about 400,000. Particularly useful PAN filament should have a tenacity of at least about 10 g/denier and an energy to break of at least about 8 joule/g. PAN filament having a molecular weight of at least about 400,000, a tenacity of at least about 15 to about 20 g/denier and an energy to break of at least about 8 joule/g is most useful in producing ballistic resistant articles; and such filaments are disclosed, for example, in U.S. Pat. No. 4,535,027.

In the case of aramid filaments, suitable aramide filaments formed principally from aromatic polyamide are described in U.S. Pat. No. 3,671,542, which is hereby incorporated by reference. Preferred aramid filament will have a tenacity of at least about 20 g/d, a tensile modulus of at least about 400 g/d and an energy-to-break at least about 8 joules/gram, and particularly preferred aramid filaments will have a tenacity of at least about 20 g/d, a modulus of at least about 480 g/d and an energy-to-break of at least about 20 joules/gram. Most preferred aramid filaments will have a tenacity of at least about 20 g/denier, a modulus of at least about 900 g/denier and an energy-to-break of at least about 30 joules/gram. For example, poly(phenylenediamine terephalamide) filaments produced commercially by Dupont Corporation under the trade name of Kevlar ® 29 and 49 and having moderately high moduli and tenacity values are particularly useful in forming ballistic resistant composites. (Kevlar ® 29 has 500 g/denier and 22 g/denier and Kevlar ® 49 has 1000 g/denier and 22 g/denier as values of modulus and tenacity, respectively). Also useful in the practice of this invention is poly(metaphenylene isophthalamide) filaments produced commercially by Dupont under the tradename Nomex ®.

In composite articles containing such filaments, the filaments are arranged in a network which can have various configurations. For example, a plurality of filaments can be grouped together to form a twisted or untwisted yarn. The filaments or yarn may be formed as a felt, knitted or woven (plain, basket, satin and crow feet weaves, etc.) into a network, or formed into a network by any of a variety of conventional techniques. In the preferred embodiments of the invention, the filaments are untwisted mono-filament yarn wherein the filaments are parallel, unidirectionally aligned. For example, the filaments may also be formed into nonwoven cloth layers by conventional techniques.

The filaments are dispersed in a continuous phase of a matrix material which preferably substantially coats each filament contained in the bundle of filament. The manner in which the filaments are dispersed may vary widely. The filaments may be aligned in a substantially parallel, unidirectional fashion, or filaments may be aligned in a multidirectional fashion with filaments at varying angles with each other. In the preferred embodiments of this invention, filaments in each layer are aligned in a substantially parallel, unidirectional fashion such as in a prepreg, pultraded sheet and the like.

The matrix material employed may vary widely and may be a metallic, semi-metallic material, an organic material and/or an inorganic material. The matrix material may be flexible (low modulus) or rigid (high modulus). Illustrative of useful high modulus or rigid matrix materials are polycarbonates; polyphenylenesulfides; polyphenylene oxides; polyester carbonates; polyesterimides; polyimides; and thermoset resins such as epoxy resins, phenolic resins, modified phenolic resins, allylic resins, alkyd resins, unsaturated polyesters, aromatic vinylesters as for example the condensation produced of bisphenol A and methacrylic acid diluted in a vinyl aromatic monomer (e.g. styrene or vinyl toluene), urethane resins and amino (melamine and urea) resins. The major criterion is that such material holds the filaments together, and maintains the geometrical integrity of the composite under the desired use conditions.

In the preferred embodiments of the invention, the matrix material is a low modulus elastomeric material. A wide variety of elastomeric materials and formulations may be utilized in the preferred embodiments of this invention. Representative examples of suitable elastomeric materials for use in the formation of the matrix are those which have their structures, properties, and formulations together with crosslinking procedures summarized in the Encyclopedia of Polymer Science, Volume 5 in the section Elastomers-Synthetic (John Wiley & Sons Inc., 1964). For example, any of the following elastomeric materials may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthate or other plasticers well known in the art, butadiene acrylonitrile elastomers, poly(isobutylene-co-isoprene), polyacrylates, polyesters, polyethers, fluoroelastomers, silicone elastomers, thermoplastic elastomers, copolymers of ethylene.

Particularly useful elastomers are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$(n=2-10) or radial configuration copolymers of the type R-$(BA)_x$(x=3-150); wherein A is a block from a polyvinyl aromatic monomer and B is a block from a conjugated diene elastomer. Many of these polymers are produced commercially by the Shell Chemical Co. and described in the bulletin "Kraton Thermoplastic Rubber", SC-68-81.

Most preferably, the elastomeric matrix material consists essentially of at least one of the above-mentioned elastomers. The low modulus elastomeric matrices may also include fillers such as carbon black, silica, glass microballons, and the like up to an amount preferably not to exceed about 50% by volume of the elastomeric material, preferably not to exceed about 40% by weight, and may be extended with oils, may include fire retardants such as halogenated parafins, and vulcanized by sulfur, peroxide, metal oxide, or radiation cure systems using methods well known to rubber technologists. Blends of different elastomeric materials may be used together or one or more elastomer materials may be blended with one or more thermoplastics. High density, low density, and linear low density polethylene may be cross-linked to obtain a matrix material of appropriate properties, either alone or as blends. In every instance, the modulus of the elastomeric matrix material should not exceed about 6,000 psi (41,300 kPa), preferably is less than about 5,000 psi (34,500 kPa), more preferably is less than 1000 psi (6900 kPa) and most preferably is less than 500 psi (3450 kPa).

In the preferred embodiments of the invention, the matrix material is a low modulus, elastomeric material. The low modulus elastomeric material has a tensile modulus, measured at about 23° C., of less than about 6,000 psi (41,300 kPa). Preferably, the tensile modulus of the elastomeric material is less than about 5,000 psi (34,500 kPa), more preferably, is less than 1,000 psi (6900 kPa) and most preferably is less than about 500 psi (3,450 kPa) to provide even more improved performance. The glass transition temperature (Tg) of the elastomeric material (as evidenced by a sudden drop in the ductility and elasticity of the material) is less than about 0° C. Preferably, the Tg of the elastomeric material is less than about −40° C., and more preferably is less than about −50° C. The elastomeric material also has an elongation to break of at least about 50%. Preferably, the elongation to break of the elastomeric material is at least about 100%, and more preferably is at least about 300%.

The proportions of matrix to filament in the composite is not critical and may vary widely depending on a number of factors including, whether the matrix material has any ballistic-resistant properties of its own (which is generally not the case) and upon the rigidity, shape, heat resistance, wear resistance, flammability resistance and other properties desired for the composite article. In general, the proportion of matrix to filament in the composite may vary from relatively small amounts where the amount of matrix is about 10% by volume of the filaments to relatively large amounts where the amount of matrix is up to about 90% by volume of the filaments. In the preferred embodiments of this invention, matrix amounts of from about 15 to about 80% by volume are employed. All volume percents are based on the total volume of the composite. In the particularly preferred embodiments of the invention, ballistic-resistant articles of the present invention contain a relatively minor proportion of the matrix (e.g., about 10 to about 30% by volume of composite), since the ballistic-resistant properties are almost entirely attributable to the filament, and in the particularly preferred embodiments of the invention, the proportion of the matrix in the composite is from about 10 to about 30% by weight of filaments.

The articles of this invention can be fabricated using a number of procedures. In general, the layers are formed by molding the combination of the matrix material and filaments in the desired configurations and amounts by subjecting them to heat and pressure.

The filaments may be premolded by subjecting them to heat and pressure. For ECPE filaments, molding temperatures range from about 20° to about 150° C., preferably from about 80° to about 145° C., more preferably from about 100° to about 135° C., and more preferably from about 110° to about 130° C. The pressure may range from about 10 psi (69 kpa) to about 10,000 psi (69,000 kpa). A pressure between about 10 psi (69 kpa) and about 100 psi (690 k$^{pa}$), when combined with temperatures below about 100° C. for a period of time less than about 1.0 min., may be used simply to cause adjacent filaments to stick together. Pressures from bout 100 psi to about 10,000 psi (69,000 kpa), when coupled with temperatures in the range of about 100° to about 155° C. for a time of between about 1 to about 5 min., may cause the filaments to deform and to compress together (generally in a film-like shape). Pressures from about 100 psi (690 kpa) to about 10,000 psi (69,000 kpa), when coupled with temperatures in the range of about 150° to about 155° C. for a time of between 1 to about 5 min., may cause the film to become translucent or transparent. For polypropylene filaments, the upper limitation of the temperature range would be about 10° to about 20° C. higher than for ECPE filament.

In the preferred embodiments of the invention, the filaments (premolded if desired) are precoated with the desired matrix material prior to being arranged in a network and molded as described above. The coating may be applied to the filaments in a variety of ways and any method known to those of skill in the art for coating filaments may be used. For example, one method is to apply the matrix material to the stretched high modulus filaments either as a liquid, a sticky solid or particles in suspension, or as a fluidized bed. Alternatively, the matrix material may be applied as a solution or emulsion in a suitable solvent which does not adversely affect the properties of the filament at the temperature of application. In these illustrative embodiments, any liquid capable of dissolving or dispersing the matrix material may be used. However, in the preferred embodiments of the invention in which the matrix material is an elastomeric material, preferred groups of solvents include water, paraffin oils, ketones, alcohols, aromatic solvents or hydrocarbon solvents or mixtures thereof, with illustrative specific solvents including paraffin oil, xylene, toluene and octane. The techniques used to dissolve or disperse the matrix in the solvents will be those conventionally used for the coating of similar elastomeric materials on a variety of substrates.

Other techniques for applying the coating to the filaments may be used, including coating of the high modulus precursor (gel filament) before the high temperature stretching operation, either before or after removal of the solvent from the filament. The filament may then be stretched at elevated temperatures to produce the coated filaments. The gel filament may be passed through a solution of the appropriate matrix material, as for example an elastomeric material dissolved in paraffin oil, or an aromatic or aliphatic solvent, under conditions to attain the desired coating. Crystallization of the polymer in the gel filament may or may not have taken place before the filament passes into the cooling solution. Alternatively, the filament may be extruded into a fluidized bed of the appropriate matrix material in powder form.

The proportion of coating on the coated filaments or fabrics may vary from relatively small amounts (e.g. 1% by weight of filaments) to relatively large amounts (e.g. 150% by weight of filaments), depending upon whether the coating material has any impact or ballistic-resistant properties of its own (which is generally not the case) and upon the rigidity, shape, heat resistance, wear resistance, flammability resistance and other properties desired for the complex composite article. In general, ballistic-resistant articles of the present invention containing coated filaments should have a relatively minor proportion of coating (e.g., about 10 to about 30 percent by volume of filaments), since the ballistic-resistant properties are almost entirely attributable to the filament. Nevertheless, coated filaments with higher coating contents may be employed. Generally, however, when the coating constitutes greater than about 60% (by volume of filament), the coated filament is consolidated with similar coated filaments to form a simple composite without the use of additional matrix material.

Furthermore, if the filament achieves its final properties only after a stretching operation or other manipulative process, e.g. solvent exchanging, drying or the like, it is contemplated that the coating may be applied to a precursor material of the final filament. In such cases, the desired and preferred tenacity, modulus and other properties of the filament should be judged by continuing the manipulative process on the filament precursor in a manner corresponding to that employed on the coated filament precursor. Thus, for example, if the coating is applied to the xerogel filament described in U.S. application Ser. No. 572,607 of Kavesh et al., and the coated xerogel filament is then stretched under defined temperature and stretch ratio conditions, then the filament tenacity and filament modulus values would be measured on uncoated xerogel filament which is similarly stretched.

It is a preferred aspect of the invention that each filament be substantially coated with the matrix material for the production of composites having improved impact protection and/or having maximum ballistic resistance. A filament is substantially coated by using any of the coating processes described above or can be substantially coated by employing any other process capable of producing a filament coated essentially to the same degree as a filament coated by the processes described heretofore (e.g., by employing known high pressure molding techniques).

The filaments and networks produced therefrom are formed into "simple composites" as the precursor to preparing the complex composite articles of the present invention. The term, "simple composite", as used herein is intended to mean composites made up of one or more layers, each of the layers containing filaments as described above with a single major matrix material, which material may include minor proportions of other materials such as fillers, lubricants or the like as noted heretofore.

The proportion of elastomeric matrix material to filament is variable for the simple composites, with matrix material amounts of from about 5% to about 150 Vol %, by volume of the filament, representing the broad general range. Within this range, it is preferred to use composites having a relatively high filament content, such as composites having only about 10 to about 50 Vol % matrix material, by volume of the composite, and more preferably from about 10 to about 30 Vol % matrix material by volume of the composite.

Stated another way, the filament network occupies different proportions of the total volume of the simple composite. Preferably, however, the filament network comprises at least about 30 volume percent of the simple composite. For ballistic protecting, the filament network comprises at least about 50 volume percent, more preferably about 70 volume percent, and most preferably at least about 75 volume percent, with the matrix occupying the remaining volume.

A particularly effective technique for preparing a preferred composite of this invention comprised of substantially parallel, unidirectionally aligned filaments includes the steps of pulling a filament or bundles of filaments through a bath containing a solution of a matrix material preferably, an elastomeric matrix material, and circumferentially winding this filament into a single sheet-like layer around and along a bundle of filaments the length of a suitable form, such as a cylinder. The solvent is then evaporated leaving a sheet-like layer of filaments embedded in a matrix that can be removed from the cylindrical form. Alternatively, a plurality of filaments or bundles of filaments can be simultaneously pulled through the bath containing a solution or dispersion of a matrix material and laid down in closely positioned, substantially parallel relation to one another on a suitable surface. Evaporation of the solvent leaves a sheet-like layer comprised of filaments which are coated with the matrix material and which are substantially parallel and aligned along a common filament direction. The sheet is suitable for subsequent processing such as laminating to another sheet to form composites containing more than one layer.

Similarly, a yarn-type simple composite can be produced by pulling a group of filament bundles through a dispersion or solution of the matrix material to substantially coat each of the individual filaments, and then evaporating the solvent to form the coated yarn. The yarn can then, for example, be employed to form fabrics, which in turn, can be used to form more complex composite structures. Moreover, the coated yarn can also be processed into a simple composite by employing conventional filament winding techniques; for example, the simple composite can have coated yarn formed into overlapping filament layers.

Figure 14:
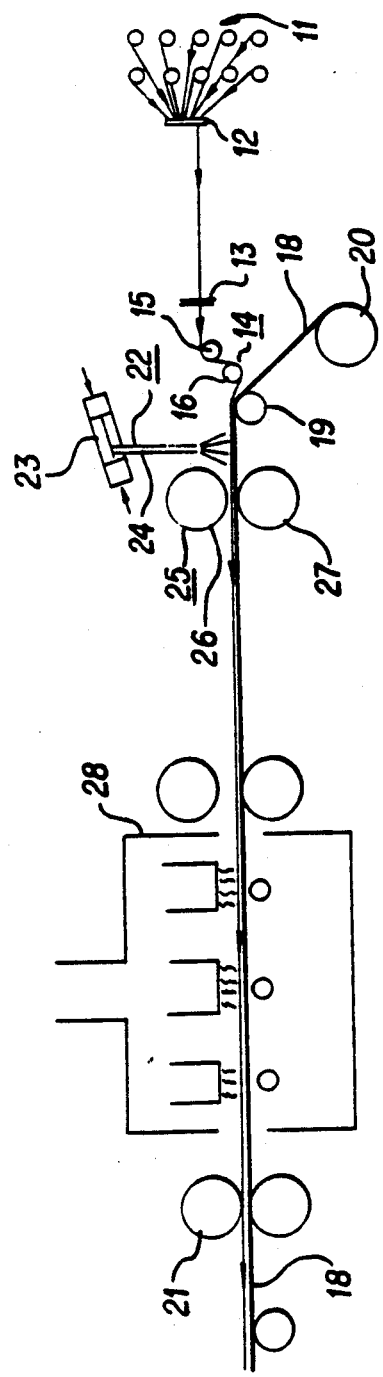
FIG. 14 illustrates in schematic form an embodiment of the process of this invention.
Figure 15:
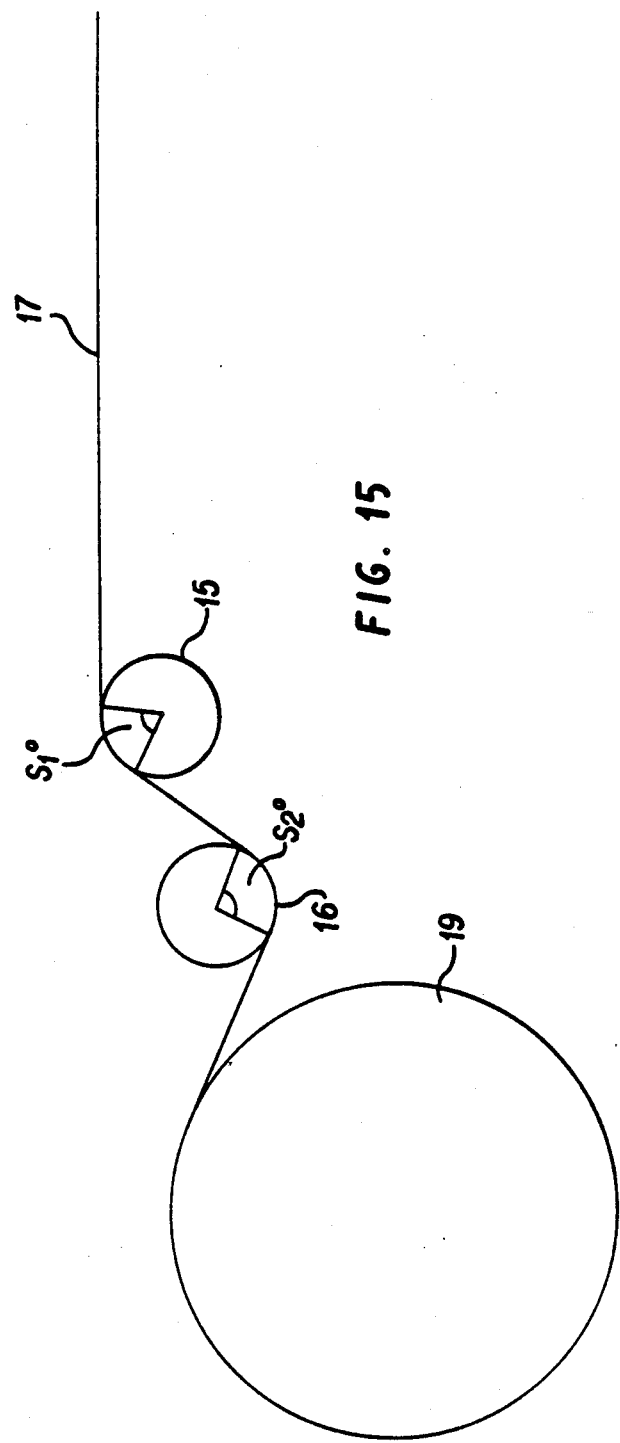
FIG. 15 is a detailed view of the spreading means used to spread a bundle of filaments into aligned filaments.
Figure 16:
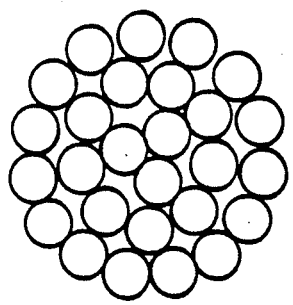
FIG. 16 is a cross-section of a bundle of filaments prior to spreading.
Figure 17:
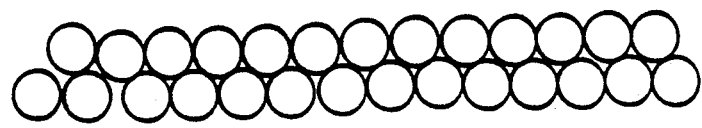
FIG. 17 is a cross-section of the bundle of filaments after spreading.

In the most preferred embodiments of this invention, the layers comprising a network of substantially parallel, unidirectionally aligned filaments in the matrix material wherein the ratio of the thickness of the layer to the equivalent diameter of the filaments is equal to or less than about 12.8 is formed by the process of this invention. This process can be more readily appreciated from the FIGS. FIG. 14 illustrates in schematic form a preferred embodiment of this invention. As shown in FIG. 14, a plurality of creels 11 containing high strength filaments, preferably high strength polyethylene, polypropylene, boron, polyvinyl alcohol, graphite, polyacrylonitrile, poly aramid or S-glass, more preferably polyethylene and aramid, and most preferably polyethylene are deployed The yarn preferably consist of bundles of from about 30 to about 2000 individual filaments of less than about 12 denier, and more preferably are bundles of from about 100 filaments of less than about 7 denier. Individual filaments are aligned coplanarly and in a substantially parallel, and unidirectional fashion by pulling the filaments through a first and second set of combs, identified in the drawings by the numerals 12 and 13 respectively. As shown in FIG. 14, the average distance between aligned filaments is controlled by the distance between neighboring pins of combs 12 and 13. The distance between neighboring pins of the second set of combs is generally equal to or less than about twice the "equivalent diameter of the filament", times the number of filaments in a bundle of filaments. In the preferred embodiments of the invention, the distance between neighboring pins is equal to or less than about 1.5 times the product of the equivalent diameter of the filament and the number of filaments in the bunder of filaments. The aligned filaments are then pulled through spreading means 14 for spreading the filaments bundle to its maximum width so that the thickness of bundle approaches the equivalent diameter of filaments in the bundle and to simultaneously improve the alignment of individual filaments within the filament bundle. As shown in FIG. 15, normally yarn consist of bundles of filaments in which the equivalent diameter of the bundle of filaments or the width of the filament bundle is very much greater than the equivalent diameter of the filaments contained in the bundle. As shown in FIGS. 16 and 17, after treatment with the spreading means, the filament bundle is spread out, and this difference is reduced, and the equivalent diameter of the filaments more closely approximates the thickness of the filament bundle. The operation of the spreading means may be more readily appreciated from FIG. 14. As shown in FIG. 14, spreading means in this preferred embodiment of the invention consists of two spread bars, 15 and 16 positioned such that the center of axis of the bars are parallel. This relative position insures that the aligned filaments 17 emerging from combs 13 will on passing through the spread bars 15 and 16 as shown in FIG. 14 will maintain an angle of contact with spread bar 15 of $S_1^o$, and an angle of contact with spread bar 16 of $S_2^o$, while the aligned filaments upstream of spreading means 14 is maintained under a tension $T_1$ and the aligned filaments downstream of spreading means 14 is maintained under a tension $T_2$. In general, at constant $T_1$ or $T_2$, the greater the value of the contact angles $S_1^o$ and $S_2^o$, the greater the value of $T_2$ and the greater the degree to which the filaments are spread out so that the thickness of the filament bundle more closely approximates the equivalent diameter of the filaments; and at constant $S_1^o$ and $S_2^o$, the greater the value of $T_1$ and $T_2$, the greater the degree to which the filaments are spread out so that the equivalent diameter of the filament more closely approximates that of the individual filaments. In general, $T_1$ and $T_2$ are different and are less than about the tensile strength of the filaments, comprising the filament, and $S_1^o$ and $S_2^o$ are the same or different and are equal to or greater than about 30°. In the preferred embodiments using the preferred polyethylene, polypropylene, aramid, S-glass, polyvinylalcohol and polyacrylonitrile filaments $T_1$ and $T_2$ are different and are from about 0.3 gpd to about 0.9 gpd, and $S_1^o$ and $S_2^o$ are the same or different and are equal to or greater than about 30°. In the particularly preferred embodiments of the invention employing the particularly preferred polyethylene and aramid filaments, $T_1$ and $T_2$ are different and are from about 0.3 gpd to about 0.6 gpd provided that $\Delta T$, the difference between $T_1$ and $T_2$ is from about 0.1 gpd to about 0.5 gpd; and $S_1^o$ and $S_2^o$ are the same or different and are from about 30° to about 270°. Amongst these particularly preferred embodiments, most preferred are those embodiments in which $T_1$ and $T_2$ are different and are from about 0.2 gpd to about 0.5 gpd and $\Delta T$ is from about 0.2 gpd to about 0.4 gpd; and in which $S_1^o$ and $S_2^o$ are the same or different and are from about 40° to about 250°.

After passing through spreading means 14, the aligned filaments which have been spread are fed onto support means, as for example release on wheel paper 18 such as silicone release paper, to support the aligned filaments. Release paper 18 is fed onto wheel 19 from paper substrate 20. The combination of release paper supported align filaments are pulled through the apparatus at a tension $T_2$ supplied by pull rolls 21 to a position directly under a matrix material applying means 22, which in FIG. 14 is a combination of reciprocating cylinder 23 connected to a source of matrix material (not shown) and a resin applicator tube 24 for applying the resin material to the supported and aligned filaments in a manner such that preferably each filament of the aligned filaments is substantially coated with the matrix. The filaments may be coated with the matrix material using any convenient method. For example, the material can be applied as a dispersion of the material in a suitable solvent or in the form of an emulsion or as a low molecular material which on consolidation cross-links to form the desired matrix material; or sprayed on as fine discrete particles of the matrix material. In the preferred embodiments of the invention, the matrix material is a low modulus material such as a block copolymer of conjugated dienes, e.g., butadiene, isoprene, and vinyl aromatic monomers, e.g., styrene, vinyl toluene and t-butyl-styrene, which is applied as a dispersion in a solvent such as water. After application of the desired matrix material, the coated filaments are consolidated into the desired composite. Consolidation methods may vary widely depending on a number of factors, as for example, the type of matrix material and the manner in which it is applied to the filaments and the type of filament. In the preferred embodiments after application of the material, the supported and coated aligned filaments are consolidated by conveying same to a leveling means 25 which spreads and substantially levels the applied material to the desired level such that the ratio of the thickness of the layer to the equivalent diameter of the filaments is after drying less than about 12.8, and in which, in addition, functions to complete the substantial coating of any uncoated filaments. In FIG. 14, leveling means are two pairs of adjustable nip rolls 26 and 27, and 31 and 32. However, other leveling means such as doctor blades and the like can be used. Under tension from pull rolls 21, the coated filaments are then converted to solvent removal means 28 to remove all or substantially all of the solvent from the matrix material coating the filaments. In FIG. 14, solvent removal means is a gas fired oven which heats the coated filaments above the vaporization temperature of the solvent and below the degradation temperature and/or melting point of the filaments and matrix material. However, any solvent removal means known to those of skill in the art can be used, as for example such oven in conjunction with a vacuum means to allow for removal of the solvent at lower temperatures. The dried layer of coated filaments in which the ratio thickness of the layer (combination of filaments and coatings), and the equivalent diameter of the filaments is equal to or less than about 12.8, together with release paper 18 are pulled from drying means 27 by pull roll 21, and wound on a rewind assembly 23 for further use in the manufacture of composites of this invention having more than one layer.

The number of layers included in the composite of this invention may vary widely depending on the uses of the composite, for example, in those uses where the composite would be used as ballistic protection, the number of layers would depend on a number of factors including the degree of ballistic protection desired and other factors known to those of skill in the ballistic protection art. In general for this application, the greater the degree of protection desired the greater the number of layers included in the article for a given weight of he article. Conversely, the lessor the degree of ballistic protection required, the lessor the number of layers required for a given weight of the article. It is convenient to characterize the geometries of such composites by the geometries of the filaments and then to indicate that the matrix material may occupy part or all of the void space left by the network of filaments. One such suitable arrangement is a plurality of layers or laminates in which the coated filaments are arranged in a sheet-like array and aligned parallel to one another along a common filament direction. Successive layers of such coated, undirectional filaments can be rotated with respect to the previous layer. An example of such laminate structures are composites with the second, third, fourth and fifth layers rotated $+45°$, $-45°$, $90°$ and $0°$, with respect to the first layer, but not necessarily in that order. Other examples include composites with $0°/90°$ layout of yarn or filaments.

One technique for forming composites of this invention having more than one layer includes the steps of arranging coated filaments into a desired network structure, and then consolidating and heat setting the overall structure to cause the coating material to flow and occupy the remaining void spaces, thus producing a continuous matrice. Another technique is to arrange layers or other structures of coated or uncoated filament adjacent to and between various forms, e.g. films, of the matrix material and then to consolidate and heat set the overall structure. In the above cases, it is possible that the matrix can be caused to stick or flow without completely melting. In general, if the matrix material is caused to melt, relatively little pressure is required to form the composite; while if the matrix material is only heated to a sticking point, generally more pressure is required. Also, the pressure and time to set the composite and to achieve optimal properties will generally depend on the nature of the matrix material (chemical composition as well as molecular weight) and processing temperature.

The composites of this invention comprising one or more layers may be incorporated into complex composites. For example, such composites may be incorporated into more complex composites to provide a rigid complex composite article suitable, for example, as structural ballistic-resistant components, such as helmets, structural members of aircraft, and vehicle panels. The term "rigid" as used in the present specification and claims, is intended to include semi-flexible and semi-rigid structures that are capable of being free standing, without collapsing. To form the complex composite, at least one substantially rigid layer is bonded or otherwise connected to a major surface of the mono or multi-layer composite. The resultant complex composite article is capable of standing by itself and is impact resistant. Where there is only one layer, the composite of this invention ordinarily forms a remote portion of the complex composite article; that is a portion that is not initially exposed to the environment, e.g., the impact of an oncoming projectile. Where there is more than one layer, the simple composite may form, for example, a core portion that is sandwiched between two rigid layers, as is particularly useful, for example, in helmet applications. Other forms of the complex composite are also suitable, for example a composite comprising multiple alternating layers of simple composite and rigid layer.

In the preferred embodiments of the invention, rigid layers are preferably comprised of an impact resistant material, such as steel plate, composite armor plate, ceramic reinforced metallic composite, ceramic plate, concrete, and high strength filament composites (for example, an aramid filament and a high modulus, resin matrix such as epoxy or phenolic resin vinyl ester, unsaturated polyester, thermoplastics, Nylon ® 6, nylon 6, 6 and polyvinylidine halides). Most preferably, the rigid impact resistant layer is one which is ballistically effective, such as ceramic plates or ceramic reinforced metal composites. A desirable embodiment of our invention is the use of a rigid impact resistant layer which will at least partially deform the initial impact surface of the projectile or cause the projectile to shatter such as aluminum oxide, boron carbide, silicon carbide and beryllium oxide (see Laible, supra, Chapters 5-7 for additional useful rigid layers). For example, a particularly useful ballistic resistant complex composite comprises a simple composite comprising highly-oriented high molecular weight polyethylene filament in an elastomeric matrix on which is formed at least one layer comprising highly-orientated ultra-high molecular weight polyethylene filament in a rigid matrix, such as an epoxy resin. Other suitable materials for the face sheets include materials which may be heat resistant, flame resistant, solvent resistant, radiation resistant, or combinations thereof such as stainless steel, copper, aluminum oxides, titanium, etc.

As a portion of the rigid impact resistant composite, the volume percent of the simple composite is variable depending upon the desired properties of the final product. The volume percent of the simple composite to the complex composite is ordinarily at least about 10%, preferably at least about 15%, and most preferably at least about 20% (for maximizing ballistic resistance). The volume percent of the simple composite to the complex composite is ordinarily at least about 5%, preferably at least about 10%, and most preferably at least about 15% (for maximizing ballistic resistance). The examples illustrate the effectiveness of a simple composite in a complex structure at various percentages of the simple composite to the total. For example, various compromises between structural rigidity and ballistic performance are attainable depending upon the specific material choices and the relative properties of the simple composites and rigid layers.

Studies of ballistic composites frequently employ a 22 caliber, non-deforming steel fragment of specified weight, hardness and dimensions (Mil-Spec. MIL-P-46593A(ORD)). The protective power of a structure is normally expressed by citing the impacting velocity at which 50% of the projectiles are stopped, and is designated the $V_{50}$ value.

Usually, a composite armor has the geometrical shape of a shell or plate. The specific weight of the shells and plates can be expressed in terms of the areal density (ADT). This areal density corresponds to the weight per unit area of the structure. In the case of filament reinforced composites, the ballistic resistance of which depends mostly on the filament, another useful weight characteristic is the filament areal density of composites. This term corresponds to the weight of the filament reinforcement per unit area of the composite (AD).

The following examples are presented to provide a more complete understanding of the invention. The specific techniques, conditions, materials, proportions and reported data set forth to illustrate the principles of the invention are exemplary and should not be construed as limiting the scope of the invention.

EXAMPLE 1

A ballistic panel was prepared by molding a plurality of sheets comprised of uni-directional high strength extended chain polyethylene (ECPE) yarn impregnated with a Kraton D1107 thermoplastic elastomer matrix (a polystyrene-polyisoprene-polystrene-block copolymer having 14 wt % styrene and a product of Shell Chemical). This yarn had a tenacity of 30 g/denier, a modulus of 1,200 g/denier and energy-to-break 55 joules/g. The elongation to break of the yarn was 4%, denier was 1,200 and an individual filament denier was 10, or 118 filaments per yarn end. Each filament has a diameter of 0.0014" (0.0036 cm). Thermoplastic elastomer impregnated sheets were prepared using the device depicted in FIGS. 14 and 15.

Resin coating system consisted of a resin applicator tube moving reciprocatingly across the width of the aligned Spectra 900 yarn (a high strength polyethylene yarn manufactured by Allied Corporation) while the resin was pumped through the tube. Liquid resin comprised of a homogeneous blend of 50% Airflex ® 120 and 50% Airflex ® 410 by volume was used. Airflex products, manufactured by Air Products and Chemicals, Inc. Airflex ® 120 is a self-crosslinking vinyl acetate-ethylene in the form of water based emulsion. The resin coated prepreg was pulled through a pair of nip rolls with a gap setting of 0.026" (0.066 cm), a gas fired hot air oven of 12 feet (366 cm) long×2 feet (61 cm) wide at an air temperature of approximately 90° C. and after drying wound on a spooler. The resin preimpregnated sheet was peeled from the silicone release paper and measured to be approximately 8" (20.3 cm) wide and the equivalent diameter of the filament was 0.0014" (0.0036 cm). The ratio of the thickness of the layer to the equivalent diameter of the filaments was 1.2 to 1.5. It contained 74% Spectra-900 uniaxially oriented yarn and 26% Airflex ® resin by weight.

The prepreg sheet was then cut into 8" (20.3 cm) squares. A total of 164 layers were prepared, and were stacked or laminated together with a 0°/90° yarn orientation with each layer having filament length perpendicular to the filament length of the adjacent layers.

The laminated composite panel was then molded between two parallel plates of 12" (30.5 cm)×12" (30.5 cm) square at a temperature of 124° C. and a pressure of 420 psi (2900 kpa) for a period of 40 minutes. After molding the panel and allowed to cool to room temperature over a 30 minute period. The molded panel was measured 8" (20.3 cm)×8" (20.3 cm)×0.249" (0.632 cm) thick and weighed 248 grams which was equivalent to an "ADT" (total panel weight divided by surface area of the panel) of 1.23 lbs/ft$^2$ (6 kg/m$^2$). The panel contained approximately 74% ECPC yarn with a yarn areal density (AD) of 0.91 lbs-yarn/ft$^2$ (4.44 kg-yarn/m$^2$). Each layer thickness was 0.0015" (0.0038 cm). The ratio of the thickness of the layer to the equivalent diameter of the filaments was 1.07.

The panel was then submitted to H. P. White Laboratory, Inc. for ballistic testing. A $V_{50}$ value of 2,131 ft/sec (650 m/sec) was obtained.

EXAMPLE 2

Example 1 was repeated with the exception that the thickness of each layer in the molded composite panel was 0.0032" (0.008 cm) and the effective thickness of the filaments was 0.0014" (0.0036 cm). The ratio of the thickness of the layer to the equivalent diameter of the filament was 2.28. A total of 82 layers was used to mold a panel of 8" (20.3 cm)×8" (20.3 cm)×0.259" (0.658 cm). The panel weighed 273 grams which was equivalent to an ADT of 1.35 lbs/ft$^2$ (6.6 kg/m$^2$). The panel contained approximately 68% ECPE yarn with a yarn areal density (AD) of 0.92 lbs-yarn/ft$^2$ (4.5 kg-yarn/m$^2$). Each layer thickness of the molded panel was 0.0032" (0.0081 cm) which was approximately double the layer thickness of 0.0015" (0.0038 cm) shown in Example 1. Ballistic testing showed that the panel has a V$_{50}$ of 1,944 ft/sec (593 m/sec).

EXAMPLE 3

A composite was prepared by dipping fabrics composed of polyethylene in an ethylene vinylacetate emulsion (Airflex 105—a product of Air Products Corporation). The fabrics used were plain weave, 14×14 ends/inch (5.5×5.5 ends/cm). Thirty (30) layers of the dipped and coated fabrics were dried and were subsequently molded together at 30 tons (27,240 kg) force at 125° C. to produce a panel which was 12"×12"×0.25" (30.5 cm×30.5 cm×0.64 cm) thick. The panel weighed approximately 595 grams which was equivalent to an ADT of 1.31 lbs/ft$^2$ (6.39 kg/m$^2$). The panel contained approximately 71% ECPC yarn with a yarn areal density (AD) of 0.93 lbs-yarn/ft$^2$ (4.55 kg-yarn/m$^2$). The thickness of each layer was 0.008" (0.02 cm) and the equivalent diameter of the filament was 0.0014" (0.0036 cm). The ratio of the thickness of the layer to the equivalent diameter of the filaments was 5.7. The panel was tested against ballistic projectiles and exhibits a V$_{50}$ of 1,570 ft/sec (480 cm/sec). The results indicate that ballistic performance for fabric based composites were far inferior to those of the composites of Examples 1 and 2.

EXAMPLE 4

Example 3 was repeated with the exception that 22 layers of fabrics of plain weave 18×18 ends/inch (7×7 ends/cm) were used. The panel areal density was 6.02 kg/m$^2$ and yarn areal density was 4.41 kg/m$^2$ which are similar to the weight and yarn areal density of the composite of Comparative Example I. The ratio of layer thickness to the equivalent diameter of the filament is 8.14. The panel has a measured V$_{50}$ of 1,582 fps (483 m/sec).

EXAMPLE 5

A ballistic panel was prepared by molding a plurality of sheets comprised of uni-directional high strength extended chain polyethylene (ECPE) yarn, using the procedure of Example 1, with a rigid thermoset matrix Thermoset Epon 828, manufactured by Shell Chemical Company. Impregnated sheets were prepared with an EN-Tech filament winding machine manufactured by Engineering Technology Inc. Using an En-Tech filament winding machine, a CTC type yarn tension compensator and a fluid metering pump, a liquid resin consisting of 100 parts by weight of Epon 828, 9.5% parts of TETA (triethylenetetramine) and 15 parts of xylene was pumped into a resin-container where the ECPE yarns were coated. The coated yarns were then wound on a rotating drum, 30" (76.2 cm) diameter, 48" (122 cm) length to form a prepeg sheet. An infra-red lamp was used to slightly heat the drum, and the sheet to approximately 50° C. for two hours to "B" stage the liquid epoxy resin. The sheet was then cut into squares (12"×12"×0.005") (30.5 cm×30.5 cm×0.0127 cm). A total of 56 layers were prepared. The layers were oriented and laminated in a 0°, 90° configuration in which the linear filament axis of adjacent layers was perpendicular. The laminated sheets were molded into a panel (12"×12"×0.279") (30.5 cm×30.5 cm×0.709 cm) under a pressure of 30 tons (27,240 kg) at a temperature of 125° C. for a period of 1 hour, after which the molded sheets were cooled for 1 hr. The panel weighed 638 grams which was equivalent to an ADT of 1.4 lbs/ft$^2$ (6.9 kg/m$^2$) and an AD of 0.92 lbs-yarn/ft$^2$ (4.5 kg-yarn/m$^2$). The composition of the panel was approximately 66% yarn and 34% resin. The thickness of each layer was 0.005" (0.0127 cm). The ratio of the thickness of the layer to the equivalent diameter of the filament was 3.57.

The panel was submitted to H. P. White Laboratory, Inc. for ballistic testing. A V$_{50}$ value of 1,969 fps (597 m/sec) was obtained.

COMPARATIVE EXAMPLE I

Example 3 was repeated with the exception that 14 layers of fabrics of plain weave 28×28 ends/inch (11×11 ends/cm) were used. The panel areal density was 6.12 kg/m$^2$ yarn areal density of the panel was 4.51 kg/m$^2$ which are similar to the yarn areal density of the composite of Comparative Example I. The ratio of layer thickness to the equivalent diameter of the filament is 12.8 and the measured V$_{50}$ was 1,448 fps (442 m/sec).

COMPARATIVE EXAMPLE II

Using the procedure of Example 5, fourteen prepeg layers having a thickness of 0.018" (0.046 cm) and in which the ratio of the thickness of the layer to the equivalent diameter of the filament is 13 were formed. The layers were laminated in a 0°, 90° configuration and the laminated sheets were molded into (12"×12"×0.256") (30.5 cm×30.5 cm×30.5 cm). The panel weighed 578 grams which was equivalent to an ADT of 1.3 lbs/ft$^2$ (6.2. kg/m$^2$) and an AD of 0.92 lbs-yarn/ft$^2$ (4.5 kg-yarn/m$^2$). The composition of the panel was approximately 72.5% yarn and 27.5% resin. The measured V$_{50}$ of the panel was 1,348 fps (408 m/sec).

COMPARATIVE EXAMPLE III

To better illustrate the advantages of this invention and the critical relationship between the ratio of thickness of the layer to the equivalent diameter of the filament to the effectiveness of the composite as protection against ballistics, the results of the previous examples are set forth in a side by side comparison in the following Table I. In the Table the abbreviations have the following meanings:

(a) "T/ED" is the ratio of the thickness of the layer to the equivalent diameter of the filament.

(b) "AD" is the total yarn weight divided by the surface area of the panel expressed in Kg-yarn/m$^2$.

(c) "ADT" is total panel weight divided by the surface area of the panel.

(d) "V$_{50}$" is the projectile velocity at which 50% of the total projectiles will be defeated by the panels being tested.

TABLE I

| Exp No | Sample | T/ED | AD (kg/m²) | ADT (kg/m²) | V₅₀ (ft/sec) | V₅₀ (m/sec) |
|---|---|---|---|---|---|---|
| 1 | Ex 1 | 1.07 | 4.44 | 6.0 | 2,131 | 650 |
| 2 | Ex 2 | 2.28 | 4.5 | 6.6 | 1,944 | 593 |
| 3 | Ex 3 | 5.17 | 4.55 | 6.39 | 1,570 | 480 |
| 4 | Ex 4 | 8.14 | 4.43 | 6.02 | 1,582 | 483 |
| 5 | Ex 5 | 3.57 | 4.5 | 6.9 | 1,969 | 597 |
| 6 | Comp Ex I | 12.8 | 4.51 | 6.12 | 1,448 | 442 |
| 7 | Comp Ex II | 13 | 4.5 | 6.2 | 1,348 | 408 |

What is claimed is:

1. An impact resistance composite comprised of one or more layers; at least one of said layers comprising a network of filaments having a tensile modulus of at least about 150 g/denier, and an energy-to-break of at least about 8 j/g and a tenacity equal to or greater than about 7 g/denier in a matrix wherein, the ratio of the thickness of said layer to the equivalent diameter of said filaments is equal to or less than about 12.8.

2. A composite as recited in claim 1 wherein said ratio is from 1 to about 10.

3. A composite as recited in claim 2 wherein said ratio is from 1 to about 8.

4. A composite as recited in claim 3 wherein said ratio is from about 1 to about 5.

5. A composite as recited in claim 4 wherein said ratio is from about 1.5 to about 3.

6. A composite as recited in claim 1 wherein the filaments have a tenacity equal to or greater than about 10 g/d, a tensile modulus equal to or greater than about 300 g/d and an energy-to-break equal to or greater than about 10 j/g.

7. A composite as recited in claim 6 wherein said tenacity is equal to or greater than about 20 g/d, said modulus is equal to or greater than about 500 g/d and said energy-to-break is equal to or greater than about 15 j/g.

8. A composite as recited in claim 7 wherein said tenacity is equal to or greater than about 25 g/d, said modulus is equal to or greater than about 1000 g/d, and said energy-to-break is equal to or greater than about 20 j/g.

9. A composite as recited in claim 1 wherein said tenacity is equal to or greater than about 30 g/d, said modulus is equal to or greater than about 1300 g/d and the energy-to-break is equal to or greater than about 30 j/g.

10. A composite as recited in claim 1 wherein the thickness of said layer is less than or equal to about 0.04 cm.

11. A composite as recited in claim 10 wherein said thickness is equal to or less than about 0.03 cm.

12. A composite as recited in claim 11 wherein said thickness is from about 0.0007 to about 0.02 cm.

13. A composite as recited in claim 12 wherein said thickness is from about 0.002 to about 0.02 cm.

14. A composite as recited in claim 1 which comprises more than one layer.

15. A composite as recited in claim 1 wherein said filaments are polyethylene filaments having a tensile modulus of at least about 800 g/denier and an energy-to-break of at least 35 j/g.

16. A composite as recited in claim 15 wherein said filaments have a tensile modulus of at least about 1100 g/denier and an energy-to-break of at least about 40 j/g.

17. A composite as recited in claim 1 wherein said network of filaments comprises a sheet-like filament array in which said filaments are arranged substantially parallel to one another along a common filament direction.

18. A composite as recited in claim 17 wherein said composite comprises more than one layer, with adjacent layers aligned, at a 90° angle with respect to the longitudinal axis of the parallel filaments contained in said layers.

19. A composite as recited in claim 1 wherein said network of filaments comprises a non-woven fabric.

20. A composite as recited in claim 1 wherein said network of filaments comprises a woven fabric.

21. A composite as recited in claim 1 wherein the volume fraction of said filaments is at least about 0.4.

22. A composite as recited in claim 1 wherein the volume fraction of said filaments is at least about 0.6.

23. A composite as recited in claim 1 wherein the volume fraction of said filaments is at least about 0.7.

24. A composite according to claim 1 wherein said matrix material is rigid having a tensile modulus of greater than about 6000 psi (41,300 kpa) measured at 25° C.

25. A composite according to claim 24 wherein said matrix material is selected from the group consisting from the group consisting of phenolic resins, epoxy resins, allylic, high density polyethylene, polyvinyl chloride, polyvinyl ester resin, unsaturated polyester resin, polymethylmethacrylate and polystyrene.

26. A composite according to claim 1 wherein said matrix material is an elastomeric materials having a tensile modulus equal to or less than about 6,000 psi (41,300 kpa) at 25° C.

27. A composite as recited in claim 2 wherein said elastomeric matrix material comprises an elastomer having a glass transition temperature of less than about 0° C.

28. A composite as recited in claim 27 wherein said elastomer has a glass transition temperature of less than about −40° C.

29. A composite as recited in claim 28 wherein said elastomer has a glass transition temperature of less than about −50° C.

30. A composite as recited in claim 26 wherein said elastomeric matrix has tensile modulus of less than about 5,000 psi.

31. A composite as recited in claim 26 wherein said elastomeric matrix material has a tensile modulus of less than about 1,000 psi (6,883 kpa).

32. A composite as recited in claim 26 wherein said elastomeric matrix material has a tensile modulus of less than about 500 psi (3,442 kpa).

33. A composite as recited in claim 1 wherein said filaments have a tenacity of at least about 15 g/denier.

34. A composite as recited in claim 1 wherein said filaments are polypropylene filaments having a tenacity of at least about 8 grams/denier.

35. A composite as recited in claim 1 wherein said filaments are aramid filaments.

36. A composite as recited in claim 1 wherein said filaments are polyvinyl alcohol filaments.

37. A composite as recited in claim 1 comprising a plurality of networks each of said networks comprising a sheet-like array of said filaments in which said filaments are aligned substantially parallel to one another along a common filament direction.

38. A composite as recited in claim 37 wherein the filament alignment directions in selected networks are rotated with respect to the alignment direction of another layer.

39. A composite as recited in claim 1 wherein said filaments are coated with an elastomeric material having a modulus equal to or less than about 6000 psi (41,300 kpa).

40. A composite as recited in claim 39 wherein said networks are consolidated together with a binder composed of a non-elastomeric material.

41. A composite as recited in claim 39 wherein said coated filaments are in the form of yarn and a plurality of the yarns are arranged to form the network.

42. A composite as recited in claim 1 wherein said network of filaments is comprised of dissimilar filaments having different compositions.

43. A composite as recited in claim 1 wherein said elastomeric material consists essentially of a polystyrene-polyisoprene-polystyrene, tri-block copolymer.

44. A composite as recited in claim 1 wherein said elastomeric material consists essentially of a polystrene-polyethylene/butylene-polystyrene tri-block copolymer.

45. A composite as recited in claim 1 wherein said elastomeric material consists essentially of a cross-linked polyisoprene or natural rubber.

46. A composite as recited in claim 1 wherein said filaments comprise polyethylene strips.

47. A composite as recited in claim 43 wherein said strips are woven to form said network.

48. A composite of claim 47 wherein each of said filament is substantially coated with said elastomeric material 49. A composite fabricated totally or in part from the composite of claim 1.

50. A composite comprising the composite of claim 1 and at least one rigid material laminated to form a rigid composite article.

51. A composite article as recited in claim 50 wherein said at least one rigid material is arranged as a layer on a major surface of said simple composite.

52. A composite article as recited in claim 50 wherein a plurality of filament are arranged in a matrix of said elastomer material to form a sheet-like material on which at least two rigid materials in the form of layers are provided, at least one rigid layer being provided on each side of said sheet-like material.

53. A composite article as recited in claim 52 wherein said at least one rigid material comprises highly oriented high molecular weight polyethylene filament in a rigid matrix material.

54. Armor plate comprising the ballistic resistant article of claim 50.

55. A helmet comprising the ballistic resistant article of claim 50.

56. A composite article according to claim 50 wherein said rigid material is a ceramic.

57. A composite article according to claim 50 wherein said rigid material is a metal.

58. A composite as recited in claim 17 wherein said composite comprises more that one layer, with adjacent layers aligned at a 45° angle with respect to the longitudinal axis of the parallel filaments contained in said layers.

* * * * *